Figure 1:
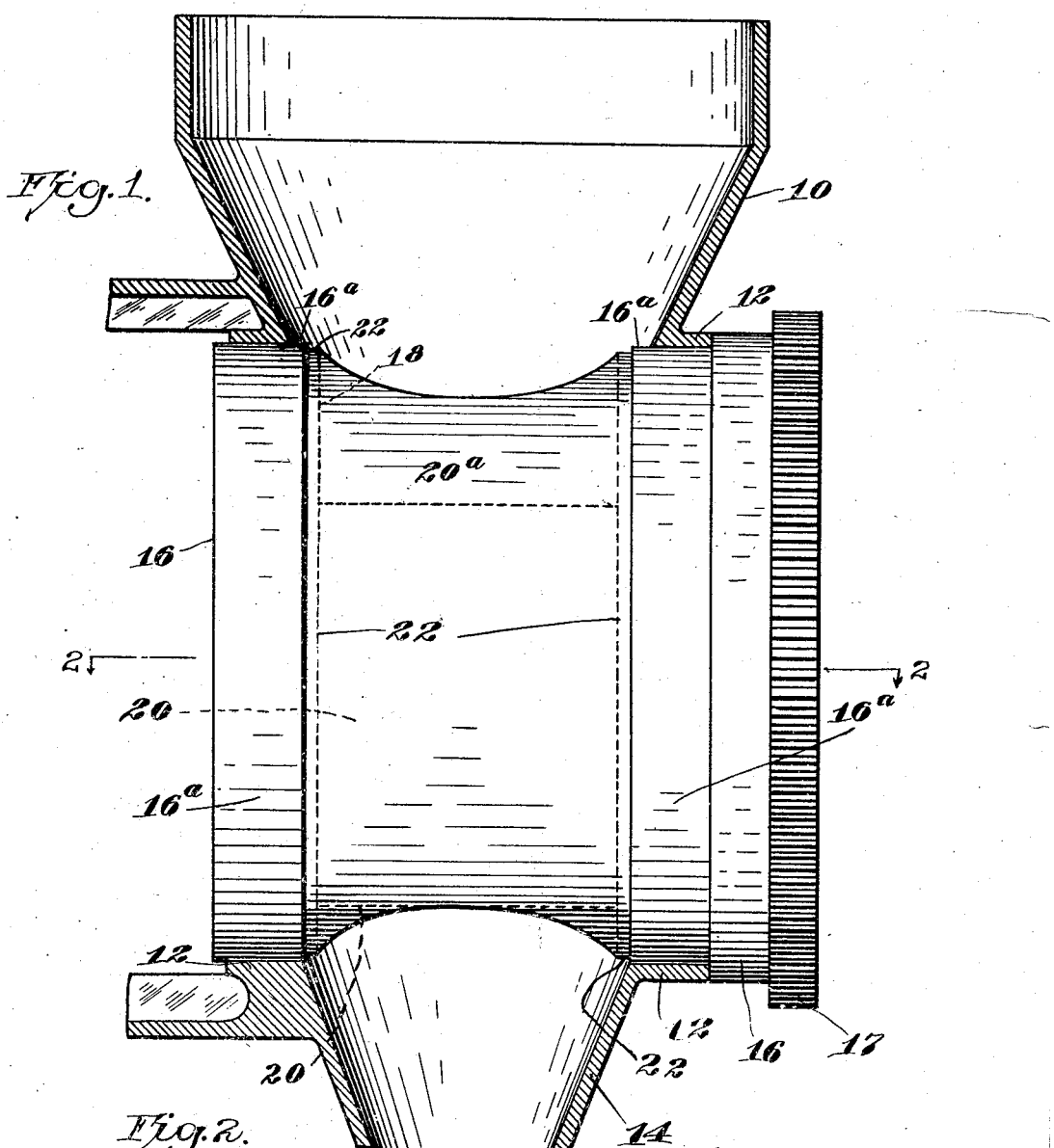

March 9, 1926.  G. H. PETRI  1,575,788

MOLDING MACHINE

Filed Oct. 24, 1923

Inventor
Gunther H. Petri
By Mitchell, Chadwick & Kent
Attorneys

Patented Mar. 9, 1926.

1,575,788

UNITED STATES PATENT OFFICE.

GUNTHER H. PETRI, OF BOSTON, MASSACHUSETTS.

MOLDING MACHINE.

Application filed October 24, 1923. Serial No. 670,574.

*To all whom it may concern:*

Be it known that I, GUNTHER H. PETRI, a citizen of the United States, residing at Boston, in the county of Suffolk and State of Massachusetts, have invented certain new and useful Improvements in Molding Machines, of which the following is a specification.

This invention relates to improvements in molding machines. More particularly, it relates to machines for handling a plastic mass, such as dough, wherein the supply presses against the side of a rotating cylindrical block containing suction holes into which, as they pass, successive sections of the dough are drawn, the progress of the mass being intermittently obstructed by the blank side of the cylinder intervening beween the intake openings. The sections thus sucked in and severed may be subsequently expelled, during another part of the circle of rotation, into a discharge tube where they form a solid column of dough that is steadily pressed forward by accretions, and is extruded through any desired and suitable apparatus, as for example through a valve which makes and cuts off annular sections suitable for doughnuts.

Such machines, as heretofore operated, have been subject to heavy retardation in the nature of friction, notwithstanding the application of ample lubricating oil; and this friction has been so great as to render practically useless for hand operation a machine which in other respects is of notable utility. Moreover the dough in such machines has been found extruding through the bearings which support the cylinder. It is an object of the invention to relieve this friction; and to prevent this extrusion. These objects are accomplished by providing a shallow annular recess in the side of the cylindrical block which contains the suction holes, so that the said intermittent obstruction is not a perfect and complete obstruction, but permits a film of dough to pass around with this cylinder, as it rotates, between it and the encasing shell in which it rotates. Such a recess may be so shallow, for example $\frac{1}{16}$ of an inch, as not to carry any appreciable amount of dough, and yet may be sufficient to eliminate the friction which has heretofore been observed when the cylinder and its shell are designed of the natural type, in which metal rubs upon metal with a lubricant interposed. In a machine made according to the invention, the ends of the cylinder remain as before, with oil lubrication in their bearings, metal against metal; but the portion of the side of the cylinder which rotates past the discharge end of the supply hopper, intermittently closing it and opening it to a suction hole, is recessed as described. The explanation why this operates to relieve the friction, and to prevent extrusion of the dough through the bearing, is not clear to me; but it seems to me that it may be because it provides space in which films of the viscous mass adhering to the rotating cylinder, and to the stationary shell, respectively, may move past each other with space enough for a third thin mass to roll between them without such rolling causing the exertion of great power because the plastic mass is not required to flow in a film thinner than is reasonably appropriate to its degree of plasticity. An embodiment of the invention is illustrated in the accompanying drawings and is hereinafter described; but it will be understood that the invention may be applied in other ways and with other material. It is intended that the patent shall cover, by suitable expression in the appended claims, whatever features of patentable novelty exist in the invention disclosed.

Figure 1 of the drawing is a medial section through the encasing shell and hoppers, with the cylindrical block shown in full lines, and its diametrical bore and the plunger therein shown in dotted lines.

Figure 2:
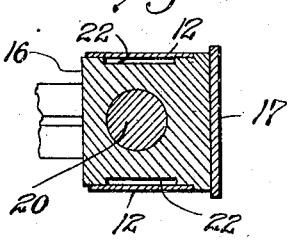

Figure 2 is a horizontal section on line 2—2 of Figure 1.

Referring to Fig. 1, the plastic mass, which will be dough in case the machine is used for molding doughnuts, is introduced into a converging hopper 10 on the upper side of a cylindrical shell 12 from whose lower side a discharge tube 14 extends, the openings in the shell casing from the hopper and into the tube being diametrically opposite to each other. The mass settles by its own weight in the hopper, toward its lower end, from which it is transferred in measured sections or quantities to the discharge tube, 14, by a cylindrical block 16 rotatable within the shell by suitable driving means connected to the annular gear 17 fixed on the end of the block outside of the cylinder. A hole 18 of slightly less diameter than the openings in the shell, is provided through the block diametrically across it and arranged to move past the shell openings as the block is rotated, so that when the ends of the hole register with the openings in the shell, there is in effect a passage from the hopper 10 through the block 16 to the discharge tube 14. This passage, however, is not open for direct flow of the plastic mass through it from hopper to tube, but is provided with a reciprocating plunger 20 whereby the mass is sucked in at one end of the hole, where it is held while the block turns through a half revolution, and by which it is expelled into the discharge tube. While the expulsion occurs at one end of the hole the suction of another charge takes place at the opposite end, so that during a complete revolution two different quantities of the plastic mass are transferred.

The plunger 20 is shown dotted in its lower position, with one end of the hole in register with the lower end of the hopper and the other end in a similar relation to the discharge tube. When in this position, the portion of the mass next to be transferred will have been drawn into the hole just above the end 20$^a$ of the plunger, and the portion of the mass which was last carried around by the block will have been discharged into the tube 14. The plunger remains in the relative position in the hole shown while the block moves through approximately a half revolution, that is, until the hole is again practically opposite the openings in the shell, whereupon mechanism, which is already known and which forms no part of the present invention, causes the plunger to move to the opposite end of the hole from the hopper side to the discharge tube side. As the plunger thus moves it sucks into the hole a charge of dough from the mass in the hopper and ejects a similar charge into the tube below. As heretofore constructed much power has been required to operate this, so much indeed as prevents turning of the block manually.

It has been the practice to make the surface of the block, except of course where the openings of the hole occur, a nice fit with the surface of the shell, but even with the most careful fit it has been found that the dough works in between the adjacent surfaces. And when thus forced to operate there is constant leakage of dough from between the block and the shell, at the ends of the bearing surfaces. The present invention is directed both to the reduction of power required and to the elimination of this leakage of the dough. It consists in cutting in the cylindrical face of the block a broad and shallow groove 22 slightly wider than the diameter of the hole 18, although a similar groove in the inner wall of the casing would serve, equally well, to provide a shallow passage between the relatively oppositely moving surfaces.

The surface 16$^a$ of the block on both sides of this groove is left unchanged, thereby providing close-fitting bearing surfaces at both axial ends of the block. Between these bearing portions, however, there is the slight annular space between the block and the shell. To this the dough has free access, and in this it apparently rolls or slips along more or less, so that the space may become filled with dough; but the facts are observed that the machine can then be easily operated by hand, or with much less consumption of power if mechanical driving means are used; and that there is no squeezing of the dough between the bearing surfaces and consequently no undesired discharge around the edges thereof. The charge of dough is sucked into the upper end of the hole, and is discharged easily into the tube below. The action is uniform without regard to the rate of speed or consistency of the material, it being apparent of course that the latter factor must be within the usage of the functions of the machine. This results in increased speed of operation, with less expenditure of power, and with great saving of lubricating materials which heretofore have been used in considerable quantities to no avail. The shallow annular chamber, provided by the groove about the block, apparently allows the dough mass to furnish its own lubrication by permitting it to roll or slide upon successive layers of itself, which spread around the chamber. Since this space is sufficient in depth for the rolling or slipping of the dough to occur without material pressure, there is no forcing of the dough between the close fitting bearing surfaces of the cylinder and consequently no leakage therefrom and no heavy drag due to the presence of a film of foreign matter (dough) between such close fitting surfaces.

I claim as my invention:

1. In a molding machine for plastic masses, the combination of a hollow casing with an inlet hopper on one side, a discharge tube on the other side, and a block rotatable within said casing and having means adapted to transfer a charge of the plastic mass from said hopper to said tube; there being a clearance between said block and its said casing comprising a shallow passageway around the block superficially from said hopper to said tube wherein part of the plastic mass enters between the adjacent and relatively-oppositely-moving faces of casing and block, clinging to each, and constituting a lubricating film.

2. In a molding machine for plastic masses, the combination of a hollow casing with an inlet hopper on one side, a discharge tube on the other side, a block rotatable in said casing having a diametrical hole therethrough, and a reciprocating plunger within said hole adapted to suck a charge of the plastic mass from the hopper into the hole and to eject it into said tube; there being a shallow peripheral groove in the surface of said block, extending between its hole openings, constituting a passageway for films of said plastic mass clinging to the relatively-oppositely-moving adjacent surfaces which form the walls of said passageway, whereby the block may be rotated with slight friction losses.

Signed at Boston, Massachusetts, this twenty-third day of October, 1923.

GUNTHER H. PETRI.